United States Patent
Holzmann et al.

(10) Patent No.: US 8,433,538 B2
(45) Date of Patent: Apr. 30, 2013

(54) METHOD AND DEVICE FOR BALANCING PRODUCTION-RELATED INACCURACIES OF THE MAGNETIC WHEEL OF AN ELECTROMOTIVE DRIVE OF A VEHICLE

(75) Inventors: Stefan Holzmann, Gaweinstal (AT); Roman Morawek, Vienna (AT); Daniel Zuffer, Hörersdorf (AT)

(73) Assignee: Continental Automotive GmbH, Hannover (DE)

( * ) Notice: Subject to any disclaimer, the term of this patent is extended or adjusted under 35 U.S.C. 154(b) by 447 days.

(21) Appl. No.: 12/680,597

(22) PCT Filed: Sep. 15, 2008

(86) PCT No.: PCT/EP2008/062224
§ 371 (c)(1),
(2), (4) Date: Mar. 29, 2010

(87) PCT Pub. No.: WO2009/043705
PCT Pub. Date: Apr. 9, 2009

(65) Prior Publication Data
US 2010/0223025 A1    Sep. 2, 2010

(30) Foreign Application Priority Data

Sep. 28, 2007 (DE) .......................... 10 2007 046 491

(51) Int. Cl.
*G01P 3/00* (2006.01)
(52) U.S. Cl.
USPC ............................ 702/148; 702/145; 702/189
(58) Field of Classification Search .................. 702/127, 702/142, 145–148, 189
See application file for complete search history.

(56) References Cited

U.S. PATENT DOCUMENTS

| | | | |
|---|---|---|---|
| 6,225,770 B1 | 5/2001 | Heinrich et al. | 318/463 |
| 6,624,603 B2 | 9/2003 | Preymann | 318/281 |
| 7,019,476 B2 * | 3/2006 | Konigshaus | 318/280 |
| 7,426,877 B2 | 9/2008 | Ehrlich et al. | 73/862.328 |
| 7,696,705 B2 | 4/2010 | Stork | 318/254.1 |

FOREIGN PATENT DOCUMENTS

| | | |
|---|---|---|
| DE | 19637631 A1 | 4/1998 |
| DE | 19835091 C1 | 6/1999 |
| DE | 19949106 A1 | 5/2001 |
| DE | 102005019515 A1 | 12/2005 |
| DE | 102006017146 A1 | 11/2006 |
| DE | 102005047366 A1 | 4/2007 |
| EP | 0974479 A2 | 7/1999 |
| EP | 1107008 A2 | 6/2001 |
| EP | 1175598 A1 | 1/2002 |
| WO | 00/08475 A1 | 2/2000 |

OTHER PUBLICATIONS

International PCT Search Report, PCT/EP2008/062224, 2 pages.
German Office Action, German Patent Application No. 102007046491.8-52, 9 pages.
German Office Action, German Patent Application No. 102007046491.8-52, 3 pages.

* cited by examiner

*Primary Examiner* — Mischita Henson
(74) *Attorney, Agent, or Firm* — King & Spalding L.L.P.

(57) ABSTRACT

In a method and a device for balancing production related inaccuracies of the magnetic wheel of an electromotive drive of a vehicle, correction factors are used, the initial value of which is factory preset, and which are modified in the course of an adaption process until the production-related inaccuracies of the magnetic wheel have been balanced as much as possible.

19 Claims, 3 Drawing Sheets

METHOD AND DEVICE FOR BALANCING PRODUCTION-RELATED INACCURACIES OF THE MAGNETIC WHEEL OF AN ELECTROMOTIVE DRIVE OF A VEHICLE

CROSS-REFERENCE TO RELATED APPLICATIONS

This application is a U.S. National Stage Application of International Application No. PCT/EP2008/062224 filed Sep. 15, 2008, which designates the United States of America, and claims priority to German Application No. 10 2007 046 491.8 filed Sep. 28, 2007, the contents of which are hereby incorporated by reference in their entirety.

TECHNICAL FIELD

The invention relates to a method and a device for balancing production-related inaccuracies of the magnetic wheel of an electromotive drive of a vehicle.

BACKGROUND

Electric actuation devices in vehicles, for example sliding roofs and window raising mechanisms, are equipped with a sensor system, which has one or two Hall sensors and interacts with a magnetic wheel connected in a torque-free manner with the rotor axle of the electromotive drive, in order to provide a Hall pulse sequence, which is used for position determination. The individual Hall pulses of the Hall pulse sequence are counted for this position determination. Furthermore the Hall pulse sequence is used in the calculation of the motor rotation speed, which is an important parameter for detection of the existence of trapping or as the case may be a fundamental input value of the anti-trap protection algorithm used in each case.

In practice the magnetic wheels employed can have production-related tolerances in terms of their magnetic distribution or sector width, so that unwelcome area displacement of up to 10% between the magnet sectors can arise.

These tolerances can be ignored for the purposes of position determination, although they are unwelcome in relation to the detection of the occurrence of a trapping instance. This is because these tolerances of sector width are fed directly into the calculation of the motor rotation speed and thereby result in a fluctuation of the calculated displacement force, which is proportional to the magnetic wheel tolerances. From this, fluctuations in the determined trapping force result, which negatively influence the stability of the system and the performance of the anti-trap protection algorithm. A method and a device for determining the actual reversal of rotation of a following rotational drive is already known from EP 1 175 598 B1. In the case of this method an asymmetrical rotor-side transmitter wheel is used, in order to provide rpm-proportional pulse sequences with intermediate reference pulses. The pulses are detected in a single stator-side sensor and analyzed in an evaluation device. This evaluation device determines the actual reversal of rotation after a completed switch of rotational direction, in particular after the completed polarity reversal of an electric rotational drive motor. This takes place by taking account of a pulse signal correction value derived from the counting of the pulse signals between in each case a reference signal before and after the actual reversal of rotation, which is detectable on the basis of a switch from a monotone increase to a monotone decrease of pulse signal lengths after a switch in direction of rotation.

A further device for determining the actual reversal of rotation of a reversing rotational drive is known from DE 10 2005 047 366 A1. This device too uses a transmitter wheel with a coding structure asymmetrically embodied in relation to the distribution along the circumference of the transmitter wheel and a single detector, which by means of scanning of the coding structure generates a rotor rpm-dependent pulse signal upon rotation of the transmitter wheel. This is fed to an evaluation unit, which determines the actual reversal of rotation through analysis of the pulse edges. The aforementioned coding structure of the transmitter wheel is formed by coding sectors of a first sector width and a pair of reference-coding sectors with a second sector width.

In order to balance the influence of the production-related tolerances of magnetic wheels with equidistant pole distribution it is already known that the pulse lengths employed for calculation of the motor rotation speed are averaged over a complete rotation of the magnetic wheel. It is disadvantageous here that as a result of this averaging over a complete rotation of the magnetic wheel and thus also of the rotor shaft of the electromotive drive, a filtering arises, which causes a time delay and further reduces the dynamics of the signal. This is disadvantageous for the anti-trap protection algorithm.

SUMMARY

According to various embodiments, a means by which the previously described disadvantages can be avoided can be identified.

According to an embodiment, a method for balancing production-related inaccuracies of the magnetic wheel of an electromotive drive of a vehicle may comprise the following steps:
S1: Movement of an electric actuation unit by means of the electromotive drive,
S2: Generation of a pulse by means of a sensor system, which interacts with a magnetic wheel attached to the rotor shaft of the electromotive drive, having adjacent sectors,
S3: Forwarding of the pulse to an evaluation unit,
S4: Calculation of the motor-rotation speed in relation to of the sector of the magnetic wheel assigned to the pulse according to the relationship $\omega_i = k_i / T_i$, where $k_i$ is a correction factor and $T_i$ is an item of information about the time interval between the forwarded pulse and the preceding pulse,
S5: Storage of the calculated motor rotation speed and of an associated sector index in a ring buffer memory,
S8: Detection of the minimum and maximum motor rotation speed stored in the ring buffer memory and of the associated sector index in each case,
S9: Adaption of the correction factor, which is assigned to the sector with the detected minimum motor rotation speed, and of the correction factor, which is assigned to the sector with the detected maximum motor rotation speed,
S11: return to step S1.

According to a further embodiment, the method may comprise the following further steps: S6: Checking as to whether the ring buffer memory is full, S7: In the case of a buffer memory which is not full, return to step S1. According to a further embodiment, the method may comprise the following further steps: S10: Checking, as to whether the system is in the steady state and—if so—branch to step S12; S12: End of the method. According to a further embodiment, an initial value for the correction factors assigned to the individual sectors of the magnetic wheel upon manufacture of the vehicle may be determined and stored in a correction factor memory. According to a further embodiment, the adaption of the correction factor which can be assigned to the sector with the detected minimum motor rotation speed, is performed according to the following relationship:

$$k_i,\text{new}=k_i,\text{old}+\Delta k,$$

where $\Delta k$ is an adaption constant. According to a further embodiment, the adaption of the correction factor which can be assigned to the sector with the detected maximum motor rotation speed, is performed according to the following relationship:

$$k_i,\text{new}=k_i,\text{old}-\Delta k,$$

where $\Delta k$ is an adaption constant. According to a further embodiment, the evaluation unit may perform a correction of the counter status of a position counter in the case of a reversing operation of the electromotive drive.

According to a further embodiment, a device for balancing production-related inaccuracies of the magnetic wheel of an electromotive drive of a vehicle, may comprise: a magnetic wheel having an adjacent sector, which is in a torque-free manner connected with the rotor shaft of an electromotive drive, a sensor system, which emits pulses upon a rotation of the magnetic wheel, and an evaluation unit connected to the sensor system, wherein it has a ring buffer memory, in which motor rotation speeds calculated by the evaluation unit can be entered, it has a correction factor memory, in which correction factors belonging to the sectors of the magnetic wheel can be entered, and the evaluation unit is provided for execution of the following steps: Calculation of the motor rotation speed in relation to a sector of the magnetic wheel according to the relationship $\omega_i=k_i/T_i$, where $k_i$ is a correction factor and $T_i$ is an item of information about the time interval between a pulse received from the evaluation unit and a preceding pulse, Storage of the calculated motor rotation speed and of an associated sector index in the ring buffer memory, Detection of the minimum and the maximum motor rotation speed stored in the ring buffer memory and of the associated sector index in each case and Adaption of the correction factor stored in the correction factor memory, which is assigned to the sector with the detected minimum motor rotation speed, and of the correction factor value stored in the correction factor memory, which is assigned to the sector with the detected maximum motor rotation speed.

According to a further embodiment of the device, the evaluation unit can be provided for execution of the following further step:—Checking as to whether the ring buffer memory is full. According to a further embodiment of the device, the evaluation unit can be provided for execution of the following further step:—Checking as to whether the system is in the steady state. According to a further embodiment of the device, the correction factor memory can be provided with correction factors stored at the factory, which are associated with the sectors of the magnetic wheel. According to a further embodiment of the device, the electromotive drive can be a window raising mechanism drive or a sliding roof drive. According to a further embodiment of the device, the evaluation unit can be provided to perform a correction of the counter status of a position counter in the case of a reversing operation of the electromotive drive.

BRIEF DESCRIPTION OF THE DRAWINGS

Further advantageous characteristics of the invention are evident from the following exemplary explanation, based on the figures, wherein.

DETAILED DESCRIPTION

The advantages of the various embodiments can be seen in particular in that correct determining of the angular velocity can take place even without the use of an averaging procedure taking place over a complete rotation of the magnetic wheel or of the rotor shaft of the electromotive drive. This in turn is a prerequisite for reliable processing of the anti-trap protection algorithm used in each case.

The various embodiments are based on correction factors adaptively determined during the movements and then used to eliminate computationally the negative effects of the tolerances of the magnetic wheel.

In the case of the various embodiments no consideration needs to be given as to whether the motor is currently running a starting procedure, is currently accelerating or currently braking. Asymmetrical disruptions of this kind are once more eliminated on average. Furthermore, neither do any short-term significant disruptions occur, as the corrections according to various embodiments only take place in small steps.

Even directly after the first commissioning of the system, this is immediately ready for operation. If, for example, a window of a vehicle initially is opened from its upper stop position, then this one opening movement is sufficient to determine the correction factors. In the case of the subsequent closure movement, in which the anti-trap protection is required for the first time, the system is already in the steady state.

Figure 1:
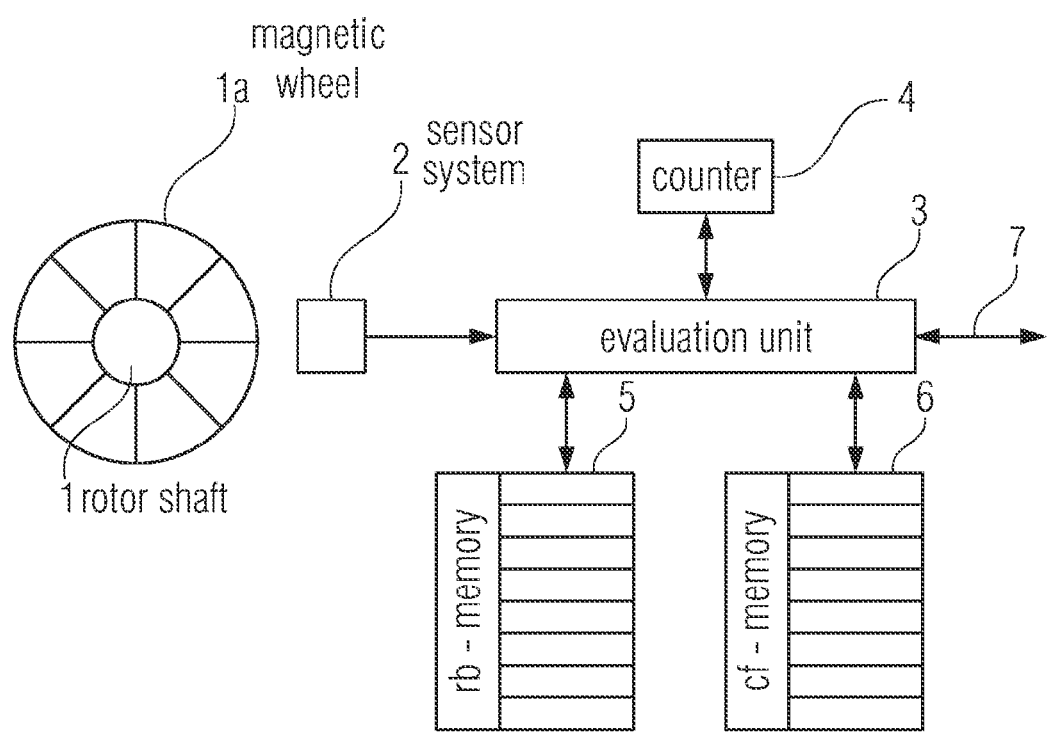
FIG. 1 shows a block diagram, which includes the important components of a device for balancing production-related inaccuracies of the magnetic wheel of an electromotive drive of a vehicle for understanding the various embodiments.

FIG. 1 shows a block diagram, which includes the important components of a device for balancing production-related inaccuracies of the magnetic wheel of an electromotive drive of a vehicle for understanding the invention. In this exemplary embodiment the electromotive drive serves to actuate a window raising mechanism of the vehicle. This electromotive drive contains a stator and a rotor, the rotor having a rotor shaft 1.

A magnetic wheel 1a is connected with the rotor shaft 1 in a torque-free manner. The magnetic wheel has sectors, which have dimensions which diverge from each other because of production-related inaccuracies in the circumferential direction of the magnetic wheel.

Upon rotation of the magnetic wheel 1a pulses are detected by a sensor system 2 and forwarded to an evaluation unit 3. Upon receiving each pulse, the evaluation unit 3, which is formed by a microcomputer, increments the positioning count value stored in a position counter 4, so that the counter status of the position counter 4 precisely describes the current position of the window pane.

Furthermore the evaluation unit 3 is provided for the calculation of motor rotation speed values, where each of these values is assigned to a sector of the magnetic wheel 1a. The calculation of the motor rotation speed takes place according to the relationship $$\omega_i=k_i/T_i.$$

Here, $k_i$ is a correction factor associated with the sector concerned. $T_i$ contains an item of information about the time interval of two successive pulses from the pulse sequence provided by the sensor system 2, belonging to the respective sector.

The correction factors associated with the individual sectors of the magnetic wheel 1*a* are stored in a correction factor memory 6 and are read out of the correction factor memory 6 by the evaluation unit 3 for calculation of the respective motor speed value. The number of storage locations of the correction factor memory 6 matches the number of sectors of the magnetic wheel 1*a*.

To determine the information $T_i$ about the time interval of two successive pulses belonging to the sector concerned, the evaluation unit 3 performs a count procedure, which commences upon incidence of the first of the cited pulses and ends upon cessation of the second of the named pulses.

The motor rotation speed value determined according to the abovementioned relationship from the correction factor and the information about the time interval of two successive pulses is stored in a ring buffer memory 5 together with a sector index, which specifies the respectively associated sector. The number of storage locations of the ring buffer memory 5 matches the number of sectors of the magnetic wheel 1*a* and thus also the number of storage locations of the correction factor memory 6.

Initial values for the correction factors stored in the correction factor memory 6 and associated with the individual sectors of the magnetic wheel 1*a* are advantageously stored in the correction factor memory 6 upon manufacture in the factory.

In subsequent operation, a balancing of the production-related inaccuracies of the magnetic wheel 1*a* of an electromotive drive of a vehicle takes place according to an adaptive method.

According to this method and working from the initial value, an adaptive adjustment of the correction factors to the actual dimensions of the respectively associated sectors of the magnetic wheel takes place. If P is the number of the sectors or poles of the magnetic wheel, then a total of P different correction factors $k_1, k_2, \ldots, k_p$ are used. These correction factors are adapted such that the production-related inaccuracies of the magnetic wheel 1*a* are balanced out and the motor rotation speed values calculated according to the relationship specified above are freed of tolerance noise, so that a steady state exists. This steady state is characterized in that the correction factors change only to a minimal further degree upon adaption. If this is detected by the evaluation unit during the adaption process, the adaption procedure is terminated.

The adaption procedure is explained in greater detail below on the basis of the flow diagram shown in FIG. 2.

After the start of the method, which is described in connection with a window raising mechanism, a movement of the window pane by means of the electromotive drive, for example from the closed state in the direction of the open state, takes place in step S1. Here, the rotor shaft 1 of the electromotive drive rotates. This has the result that in step S2 pulses are generated from the sensor system as a result of the interaction between the magnetic wheel 1*a*, said magnetic wheel 1 being connected in a torque-free manner to the rotor shaft 1 and having adjacent sectors, and the sensor system 2.

In step S3 a forwarding of each of these pulses to the evaluation unit 3 takes place.

According to step S4 a calculation of the motor rotation speed in relation to the sector of the magnetic wheel assigned to a pulse subsequently takes place in the evaluation unit 3 according to the relationship $\omega_i = k_i / T_i$, where $k_i$ is the correction factor and $T_i$ is the information about the time interval between the current pulse and the preceding pulse.

Thereafter in step S5, the calculated motor rotation speed and an associated sector index are stored in the ring buffer memory 5.

According to step S6, a check is performed as to whether the ring buffer memory 5 is full or as to whether all storage locations of the ring buffer memory are occupied in each case with a motor rotation speed value.

If it is detected that this is not the case, then according to step S7 a return to step S1 takes place.

If on the other hand the ring buffer memory 5 is full, the evaluation unit 3 checks the contents of the ring buffer memory 5 according to step S8, in order to detect the minimum and maximum rotational speed stored in the ring buffer memory and the associated sector index in each case.

Subsequently in step S9 both the correction factor, which is assigned to the sector with the detected minimum motor rotation speed, as well as the correction factor, which is assigned to the sector with the detected maximum motor rotation speed, are adapted. The adaption of the correction factor, which is assigned to the sector with the detected minimum motor rotation speed takes place according to the following relationship:

$$k_i,\text{new} = k_i,\text{old} + \Delta k.$$

The adaption of the correction factor which is assigned to the sector with the detected maximum motor rotation speed, takes place according to the following relationship:

$$k_i,\text{new} = k_i,\text{old} - \Delta k.$$

Here, $\Delta k$ is in each case an adaption constant. With its value it can be prescribed how quickly the system is to attain the steady state and on the other hand how sensitive it is to disruptions. The newly determined values for the correction factors are stored in the respectively associated storage location of the correction factor memory 6 instead of the correction factor value previously stored therein.

In step S10 a check is performed as to whether the system is in the steady state or not yet.

If the system is not yet in the steady state, then according to step S11 a return to step S1 takes place, in order to continue the adaption process.

If on the other hand the system is in the steady state, a transfer to step S12 takes place, representing the end of the method.

Figure 3:
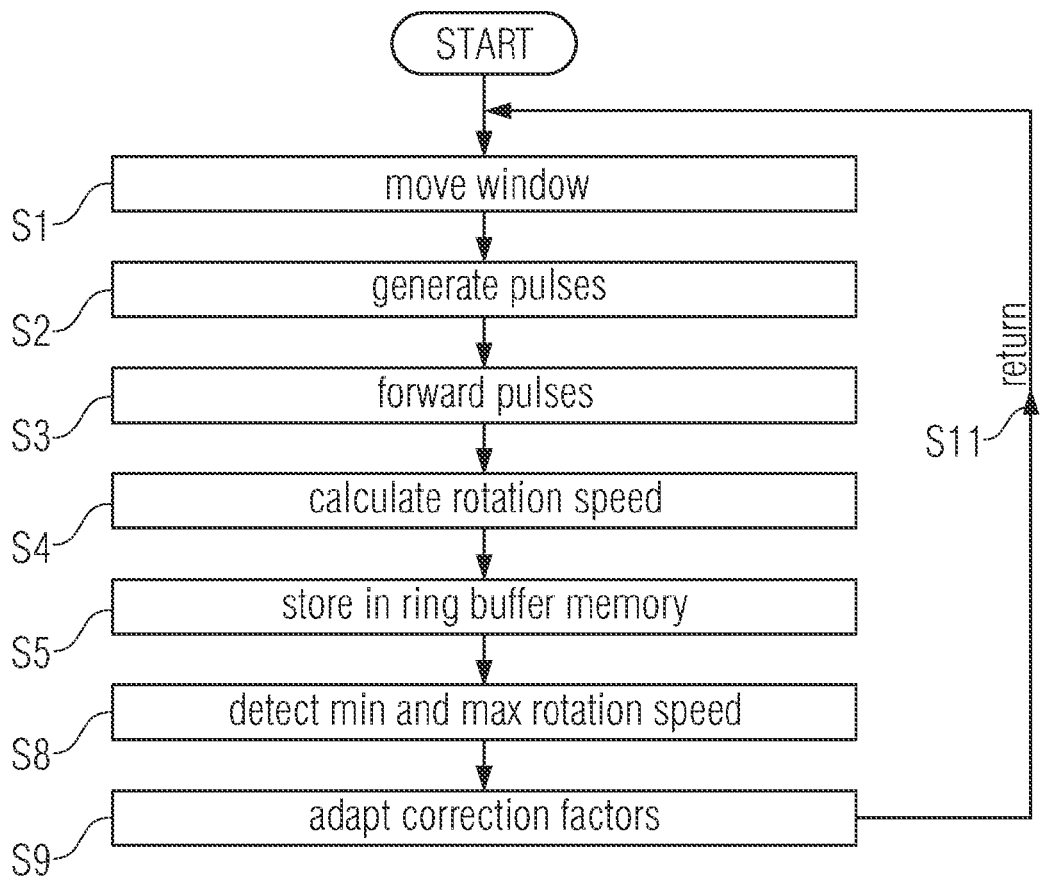

FIG. 3 shows a flow diagram for the explanation of a further method for balancing production-related inaccuracies of the magnetic wheel of an electromotive drive of a vehicle.

Figure 2:
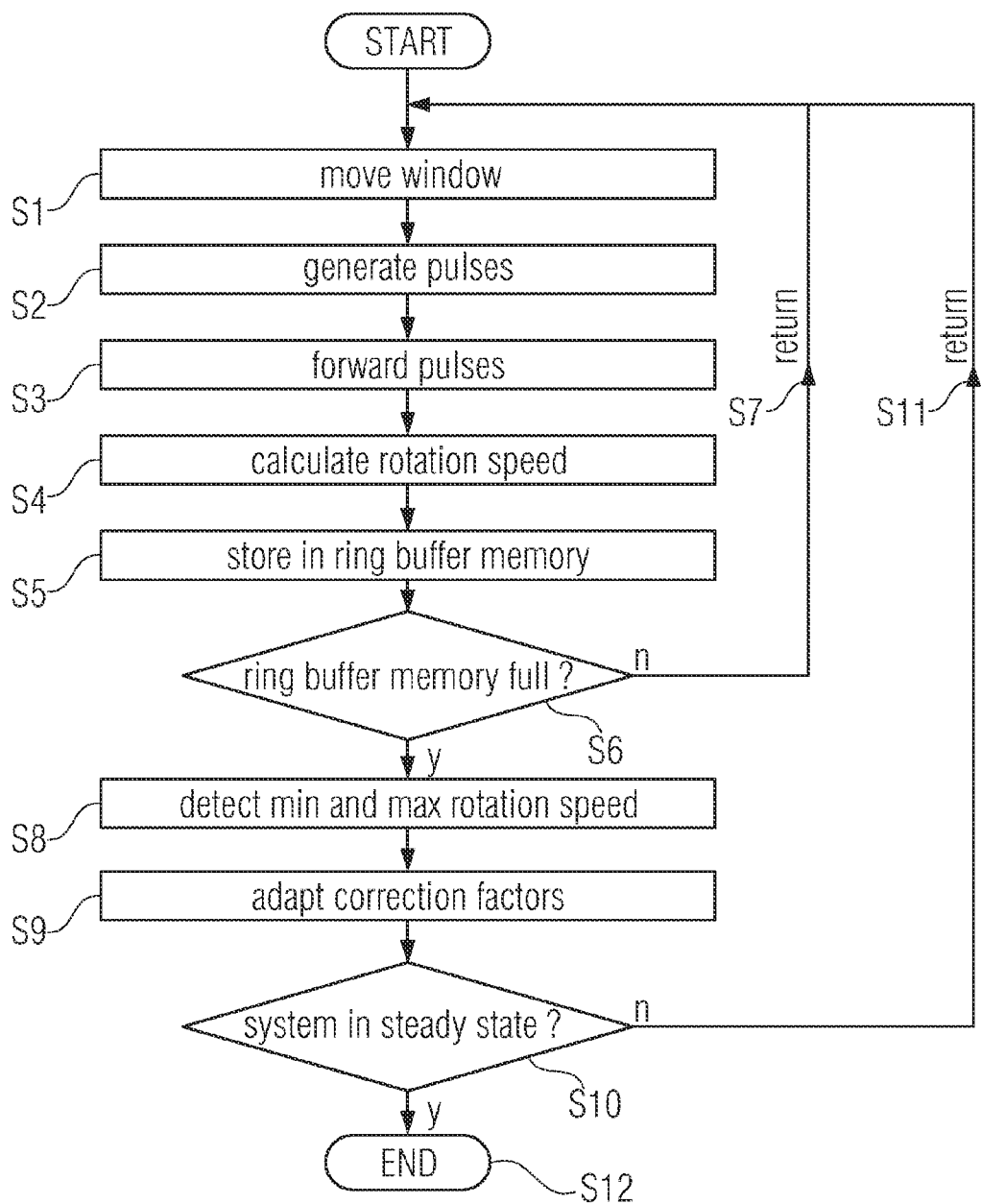
FIG. 2 shows a flow diagram illustrating a method for balancing production-related inaccuracies of the magnetic wheel of an electromotive drive of a vehicle and FIG. 3 shows a flow diagram illustrating a further method for balancing production-related inaccuracies of the magnetic wheel of an electromotive drive of a vehicle.

The method illustrated in FIG. 3 differs from the method shown in FIG. 2 in that the step involving the check as to whether the ring buffer memory is full, and the step involving the return to step S1 in the case of a ring buffer memory which is not full, are not provided. Furthermore, the method illustrated in FIG. 3 differs from the method shown in FIG. 2 in that the step involving the check as to whether the system is in the steady state, is not provided.

In the case of the method illustrated in FIG. 3, the adaption of the correction factors takes place continuously over the entire lifetime of the system. In the steady state of the system only negligibly small changes of the correction factors will still occur.

By means of the method previously described correct correction factors automatically arise after a short time, each of these correction factors being assigned to one of the sectors of the magnetic wheel 1*a*. Using these correct correction factors, the respectively associated angular velocity can be correctly calculated. This in turn increases the reliability of the anti-trap protection algorithm employed, without an averaging over a complete motor rotation being necessary for this increase in reliability.

As already mentioned above, in the case of the adaption procedure according to the various embodiments no consideration needs to be given as to whether the motor is currently running a starting procedure, is currently accelerating or currently braking, as asymmetrical disruptions such as these are once more eliminated on average. Furthermore, neither do any short-term significant disruptions occur, as the adaption of the correction factors only takes place in small steps.

One advantageous development of the various embodiments consists of the use of the production-related inaccuracies of the magnetic wheel in the case of a reversing operation of the drive for a correction of the counter status of the position counter 4. To this end, one of the sectors is used as a reference sector and counting of the pulse signals takes place before and after the actual reversal of rotation, by means of which a switch from a monotone increase of pulse signal intervals to a monotone decrease of pulse signal intervals can be detected and a corresponding correction of the counter status of the position counter can be initiated.

The invention claimed is:

1. A method for use with a magnetic wheel of an electromotive drive of a vehicle, the method comprising:
    moving an electric actuation unit by means of the electromotive drive,
    generating a pulse by means of a sensor system, which interacts with a magnetic wheel attached to the rotor shaft of the electromotive drive, having adjacent sectors,
    forwarding of the pulse to an evaluation unit,
    calculating the motor-rotation speed in relation to the sector of the magnetic wheel assigned to the pulse according to the relationship $\omega_i = k_i/T_i$, where $k_i$ is a correction factor and $T_i$ is a the time interval between the forwarded pulse and the preceding pulse,
    storing the calculated motor rotation speed and an associated sector index in a ring buffer memory,
    detecting the minimum and maximum motor rotation speed stored in the ring buffer memory and the associated sector index in each case, and
    adapting the correction factor assigned to the sector with the detected minimum motor rotation speed, and adapting the correction factor assigned to the sector with the detected maximum motor rotation speed.

2. The method according to claim 1, comprising before detecting the minimum and maximum motor rotation speed the following further steps:
    checking as to whether the ring buffer memory is full,
    in the case of a buffer memory which is not full, calculating and storing additional instances of the motor rotation speed until the ring buffer memory is full.

3. The method according to claim 1, wherein an initial value for the correction factors assigned to the individual sectors of the magnetic wheel upon manufacture of the vehicle is determined and stored in a correction factor memory.

4. The method according to claim 1, wherein the adoption of the correction factor which is assigned to the sector with the detected minimum motor rotation speed, is performed according to the following relationship:

$$k_i, \text{new} = k_i, \text{old} + \Delta k,$$

where $k_i$,old represents a first value of the correction factor, $\Delta k$ is an adoption constant, and $k_i$,new represents an adapted value of the correction factor.

5. The method according to claim 1, wherein the adaption of the correction factor which is assigned to the sector with the detected maximum motor rotation speed, is performed according to the following relationship:

$$k_i, \text{new} = k_i, \text{old} - \Delta k,$$

where $k_i$,old represents a first value of the correction factor, $\Delta k$ is an adaption constant, and $k_i$,new represents an adapted value of the correction factor.

6. The method according to claim 1, wherein the evaluation unit performs a correction of the counter status of a position counter in the case of a reversing operation of the electromotive drive.

7. A device for use with a magnetic wheel of an electromotive drive of a vehicle, the device comprising:
    a magnetic wheel having an adjacent sector, which is in a torque-free manner connected with the rotor shaft of an electromotive drive,
    a sensor system, which emits pulses upon a rotation of the magnetic wheel, and
    an evaluation unit connected to the sensor system,
    a ring buffer memory, in which motor rotation speeds calculated by the evaluation unit can be entered,
    a correction factor memory, in which correction factors belonging to the seqtors of the magnetic wheel can be entered, and
    wherein the evaluation unit is operable:
        to calculate the motor rotation speed in relation to a sector of the magnetic wheel according to the relationship $\omega_i = k_i/T_i$, where $k_i$ is a correction factor and $T_i$ is an item of information about the time interval between a pulse received from the evaluation unit and a preceding pulse,
        to store the calculated motor rotation speed and an associated sector index in the ring buffer memory,
        to detect the minimum and the maximum motor rotation speed stored in the ring buffer memory and the associated sector index in each case,
        to adapt the correction factor stored in the correction factor memory, which correction factor is assigned to the sector, with the detected minimum motor rotation speed, and
        to adapt the correction factor value stored in the correction factor memory, which correction factor is assigned to the sector, with the detected maximum motor rotation speed.

8. The device according to claim 7, wherein the evaluation unit is further operable:
    to check as to whether the ring buffer memory is full.

9. The device according to claim 7 wherein the evaluation unit is further operable:
    to check as to whether the system is in the steady state.

10. The device according to claim 7, wherein the correction factor memory is provided with correction factors stored at the factory, which are associated with the sectors of the magnetic wheel.

11. The device according to claim 7, wherein electromotive drive is a window raising mechanism drive or a sliding roof drive.

12. The device according to claim 7, wherein the evaluation unit is provided to perform a correction of the counter status of a position counter in the case of a reversing operation of the electromotive drive.

13. A system for use with a magnetic wheel of an electromotive drive of a vehicle, the system comprising:
    an electromotive drive for moving an electric actuation unit, a sensor system generating a pulse, which interacts with a magnetic wheel attached to a rotor shaft of the electromotive drive, having adjacent sectors, an evaluation unit receiving the pulse which calculates the motor-rotation speed in relation to of a sector of the magnetic wheel assigned to the pulse according to the relationship $\omega_i = k_i/T_i$, where $k_i$ is a correction factor and $T_i$ is an item of information about a time interval between a forwarded pulse and a preceding pulse, and storing a calculated motor rotation speed and an associated sector index in a ring buffer memory, wherein the evaluation unit further detects the minimum and maximum motor rotation speed stored in the ring buffer memory and the associated sector index, respectively and adapts the correction factor assigned to the sector with the detected minimum motor rotation speed, and adapts the correction factor assigned to the sector with the detected maximum motor rotation speed.

14. The system according to claim 13, wherein the evaluation unit is further operable to check before detecting the minimum and maximum motor rotation speed as to whether the ring buffer memory is full, and in the case of a buffer memory which is not full to calculate and store a further motor rotation speed and associated sector index.

15. The system according to claim 13, wherein the evaluation unit is further operable to check as to whether the system is in the steady state.

16. The system according to claim 13, wherein an initial value for the correction factors assigned to the individual sectors of the magnetic wheel upon manufacture of the vehicle is determined and stored in a correction factor memory.

17. The system according to claim 13, wherein the adaption of the correction factor which is assigned to the sector with the detected minimum motor rotation speed, is performed according to the following relationship:

$$k_i,\text{new} = k_i,\text{old} + \Delta k,$$

where $k_i$,old represents a first value of the correction factor, $\Delta k$ is an adaption constant, and $k_i$,new represents an adapted value of the correction factor.

18. The system according to claim 13, wherein the adaption of the correction factor which is assigned to the sector with the detected maximum motor rotation speed, is performed according to the following relationship:

$$k_i,\text{new} = k_i,\text{old} - \Delta k,$$

where $k_i$,old represents a first value of the correction factor, $\Delta k$ is an adaption constant, and $k_i$,new represents an adapted value of the correction factor.

19. The system according to claim 13, wherein the evaluation unit performs a correction of the counter status of a position counter in the case of a reversing, operation of the electromotive drive.

* * * * *